United States Patent
Cysz et al.

(10) Patent No.: US 7,254,572 B2
(45) Date of Patent: Aug. 7, 2007

(54) SYSTEM AND A METHOD FOR SELECTING SHOPS FOR THE REPAIR OF RAILCARS

(75) Inventors: Charlene R. Cysz, Oak Lawn, IL (US); Alan R. Tilley, Chesterton, IN (US); Rick R. Roberts, Chesterton, IN (US); Andrew J. Sutherland, Naperville, IL (US)

(73) Assignee: General Electric Railcar Services Corporation, Chicago, IL (US)

( * ) Notice: Subject to any disclaimer, the term of this patent is extended or adjusted under 35 U.S.C. 154(b) by 263 days.

(21) Appl. No.: 10/159,741

(22) Filed: May 31, 2002

(65) Prior Publication Data

US 2003/0018635 A1    Jan. 23, 2003

(51) Int. Cl.
*G06F 17/30*    (2006.01)
(52) U.S. Cl. ............... 707/3; 707/7; 707/10; 707/104.1
(58) Field of Classification Search .............. 707/1–10, 707/100–104.1, 200–206
See application file for complete search history.

(56) References Cited

U.S. PATENT DOCUMENTS

| | | | |
|---|---|---|---|
| 6,263,322 B1 * | 7/2001 | Kirkevold et al. .......... | 705/400 |
| 6,330,542 B1 * | 12/2001 | Sevcik et al. ................... | 705/8 |
| 6,523,021 B1 * | 2/2003 | Monberg et al. ............... | 707/2 |
| 6,754,485 B1 * | 6/2004 | Obradovich et al. ...... | 455/414.1 |

OTHER PUBLICATIONS http://web.archive.org/web/20000229172744/http://www.superpages.com, www.Superpages.com's archive dated in Feb. 29, 2000, Copyright 2000 GTE.*
http://yellowpages.superpages.com/listings.jsp?SRC=&STYPE=S&PG=L&R=N&R=N&C=railcar+repair+&N=&T=&S=&search=Find+It&Find+%21.x=0&Find+It%21.y=0.*
http://yellowpages.superpages.com/yp.basic.jsp?STYPE=D&C=railcar+repair+&R=N.*
http://yellowpages.superpages.com/listings.jsp?STYPE=D&CB=&R=D&RADR=&OO=&C=railcar+repair+&N=&RR=100&AL=&RE=&L=+Fairbanks=IN&PS=15&search=Find+It.*
http://yellowpages.superpages.com/reviews/userrateit.jsp?C+railcar+repair+&R=N&STYPE=S&LID=V3kWDBgPVyx2clDH9hVb4w%3D%3D.*
http://web.archive.org/web/*/http://www.superpages.com, from Wayback Machine (http://www.archive.org), web site date of www.superpages.com is Feb. 29, 2000.*

* cited by examiner

*Primary Examiner*—Isaac Woo
(74) *Attorney, Agent, or Firm*—McDermott Will & Emery LLP

(57) ABSTRACT

The present invention relates to a system and a method of optimizing the selection of shops to repair railcars. More specifically, the present invention relates to a system and a method whereby a customer needing to have a railcar repaired may enter information into an input. Further, the input may be processed via a processor and a database may be utilized to determine the optimal shop that can be used to repair the railcar. Moreover, the present invention may allow the shops to be notified that a railcar is being sent to the shops. Further the present invention may determine whether the shops may handle the repair of the railcar. The system and the method may be utilized to reduce the repair cycle time for a railcar so that a railcar may be repaired quickly, inexpensively, and efficiently.

20 Claims, 5 Drawing Sheets

FIG. 2

Identification number: _____
Railcar type: _____
Location: _____
Destination: _____
Is railcar clean? _____
    If not, what commodity? _____
Bad order: _____

Optimized Shop Selection — 38

Car: XXX XXXX
Car type: XXXX XXX XXXXXX
Inbound location: XXXXXX
Destination: XXXXX Optimization Date/Time
XX/XX/XX
XX:XX:XX

| Shop | Shop name | Rank | Est. I/O miles | Est. I/O days | Est. days in shop |
|---|---|---|---|---|---|
| XX | XXXXX | XX | XX | XX | XX |
| XX | XXXXX | XX | XX | XX | XX |
| XX | XXXXX | XX | XX | XX | XX |
| XX | XXXXX | XX | XX | XX | XX |
| XX | XXXXX | XX | | | |

SYSTEM AND A METHOD FOR SELECTING SHOPS FOR THE REPAIR OF RAILCARS

FIELD OF THE INVENTION

The present invention relates to a system and a method of optimizing the selection of shops to repair railcars. More specifically, the present invention relates to a system and a method whereby a customer needing to have a railcar repaired may enter information into an input. Further, the input may be processed via a processor and a database may be utilized to determine the optimal shop that may be used to repair the railcar. Moreover, the present invention may allow the shops to be notified that a railcar is being sent to the shops. Further the present invention may determine whether the shops can handle the repair of the railcar. The system and the method may ultimately be utilized to reduce the repair cycle time for a railcar so that a railcar may be repaired quickly, inexpensively, and efficiently.

BACKGROUND OF THE INVENTION

It is, of course, generally known to repair railcars in the railcar industry. Typically, railcars may be damaged during use for a number of reasons, including, for example, wear-and-tear, or damage that may occur from weather, negligence, vandals, or any other damage that may occur during the use of the railcar. Moreover, a railcar may be damaged during construction, or otherwise constructed incorrectly.

Damage that may occur to a railcar may include dents, scratches, and/or gouges that may occur to the walls of the railcar. Moreover, damage may occur internally to the railcar, for example to a lining that may have been coated to a railcar to help contain a chemical or other commodity that may be stored and/or transported within the railcar. Moreover, damage may occur to seams or valves that may release commodity thereby endangering people and/or the surrounding environment. In addition, damage may occur to the trucks, wheels, hitches, electrical systems, brakes, doors, or any other mechanism on the railcar that may be apparent to one having ordinary skill in the art.

There are a plurality of railcar repair shops that may be utilized to repair the railcars that may have damage to them. However, each particular railcar repair shop may be specialized in handling a particular problem, or otherwise may not be able to handle the full spectrum of repair needs that railcars may require. Moreover, the railcar repair shops may be spread over long distances making it impractical or overly costly to ship the railcars to particular railcar repair shops in order to complete the repair of the railcar. Moreover, travelling railcar repair shops, or mobile repair units (MRUs) may be utilized to meet a railcar on a track or otherwise in storage so that the railcar may be repaired without moving the railcar to a railcar repair shop.

Further, it is difficult to determine whether a railcar falls within the "Home Rule One" standard of the railroad industry. "Home Rule One" generally refers to the railroad industry standard that requires that railcars be shipped back to a particular location (i.e. the railroad "pool" or lessee loading point) after the railcar has delivered its commodity. The railcar may be shipped back to the railroad pool by the transporter or a customer per industry car service rules. As noted, it is difficult to determine whether a particular railcar falls under the "Home Rule One" standard without researching the particular railcar, which may take both time and energy to accomplish.

Therefore, a need exists for a system and a method of determining railcar repair shops for a variety of repair needs. Moreover, a need exists for a system and a method that may select a repair shop, or a plurality of repair shops, based on input information such as, for example, the location of the railcar, the type of repair needed, and the type of railcar. Moreover, a need exists for a system and a method whereby a particular customer may have preferences input into the system so that the customer utilizes only pre-approved repair shops for the cars of the customer. In addition, a need exists for a system and a method that tracks railcars to determine whether the railcars fall under the "Home Rule One" standard of the railroad industry.

SUMMARY OF THE INVENTION

The present invention relates to a system and a method of optimizing the selection of shops to repair railcars. More specifically, the present invention relates to a system and a method whereby a customer needing to have a railcar repaired may enter information into an input. Further, the information may be processed via a processor and a database may be utilized to determine the optimal shop that may be used to repair the railcar. Moreover, the present invention may allow the shops to be notified when a railcar is being sent to the shops. Further the present invention may determine whether the shops can handle the repair of the railcar. The system and the method may ultimately be utilized to reduce the repair cycle time for a railcar so that a railcar may be repaired quickly, inexpensively, and efficiently.

The system may comprise the following components: (1) a database containing a plurality of stored shop descriptions wherein the shop descriptions may comprise shop locations, types of railcars that the shops can handle, types of damage that the shops can repair, whether mobile repair units are on the premises and any other information apparent to one skilled in the art; (2) an input screen whereby a user may input into the system information about a railcar that needs to be repaired; and (3) an output whereby the system may rank and compile a list of shops that may be utilized by the user to repair the railcar.

Further, the system may include a module for allowing a user to input shop preferences into the system, such as whether a shop should be a mandatory addition to the compiled list of shops, whether the shop is merely recommended to be included on the compiled list of shops, and whether the shop should not be included on the compiled list of shops.

In addition, the system may include a module for allowing a user to input bad order reasons into the system wherein the bad order reasons may include a standardized list that may apply to any type of railcar that may be repaired in the shops.

Moreover, the system may be contained on a computer network, such as, for example, the Internet and may be accessible from a plurality of portals by a user and by a system administrator.

The method of the present invention may includes the following steps: (1) providing a database containing a plurality of stored shop descriptions wherein the shop descriptions may comprise shop locations, types of railcars that the shops can handle, types of damage that the shops can repair, whether mobile repair units are on the premises, and any other information apparent to one skilled in the art; (2) providing an input screen whereby a user may input into the system information about a railcar that needs to be repaired; (3) processing the information to compile a list of recommended shops based on the information that is input into the system by the user; and (4) providing an output whereby the output provides the list of recommended shops to the user.

Further, the method may include a step for providing a module for allowing a user to input shop preferences into the system, such as whether a shop should be a mandatory addition to the compiled list of shops, whether the shop is recommended to be included on the compiled list of shops, and whether the shop should not be included on the compiled list of shops.

In addition, the method may include a step for providing a module for allowing a user to input bad order reasons into the system wherein the bad order reasons may include a standardized list that may apply to any type of railcar that may be repaired in the shops.

Moreover, the method may provide a step for providing the system on a computer network, such as, for example, the Internet and may be accessible from a plurality of portals by a user and/or by a system administrator.

It is, therefore, an advantage of the present invention to provide a system and a method that may efficiently store a database of information related to a plurality of repair shops to aid in the selection of the railcar repair shop that may be utilized to repair a railcar. Moreover, the present invention may allow for a central location of information related to the railcar repair shops so that a railcar repair shop may be utilized quickly.

In addition, an advantage of the present invention may include a central database that may keep information related to a plurality of railcar repair shops, including, for example, the location of the railcar repair shops and the types of repairs that the railcar repair shop can accomplish so that railcars may be assigned to the railcar repair shops based on the location of the railcar and the type of damage that has been done to the railcars.

Further, it is an advantage of the present invention to provide a system and a method that may control the flow of railcars to a plurality of shops so that the shops may be efficiently utilized. Still further, the present invention may keep railcars from being sent to non-approved shops (i.e. shops that are not approved to handle the repair of certain types of railcars, shops that may not be able to handle specific commodities that may be contained within the railcars, or shops that may not be able to handle the specific type of repair necessary).

In addition, an advantage of the present invention may allow a database to keep information and track the activity of an MRU, and further may determine why MRU's were not chosen by customers to be utilized to repair the damaged railcar. In addition, the present invention may allow a plurality of railcar repair shops to be ranked based on how useful the shop may be in repairing the particular damage. A customer may ultimately choose what repair shop may be utilized to repair the railcar.

BRIEF DESCRIPTION OF THE DRAWINGS

FIG. 2 is an input screen shot of a user interface program of the system shown in FIG. 1.

FIG. 4 is an output screen shot of a user interface program of the system for optimizing the selection of shops to repair railcars shown in FIG. 1.

DETAILED DESCRIPTION OF THE PRESENTLY PREFERRED EMBODIMENTS

The present invention relates to a system and a method of optimizing the selection of shops to repair railcars. More specifically, the present invention relates to a system and a method whereby a customer needing to have a railcar repaired may enter information into an input. Further, the input may be processed via a processor and a database may be utilized to determine the optimal shop that may be used to repair the railcar. Moreover, the present invention may allow the shops to be notified that a railcar is being sent to the shops. Further the present invention may determine whether the shops can handle the repair of the railcar. The system and the method ultimately may be utilized to reduce the repair cycle time for a railcar so that a railcar may be repaired quickly, inexpensively, and efficiently.

Figure 1:
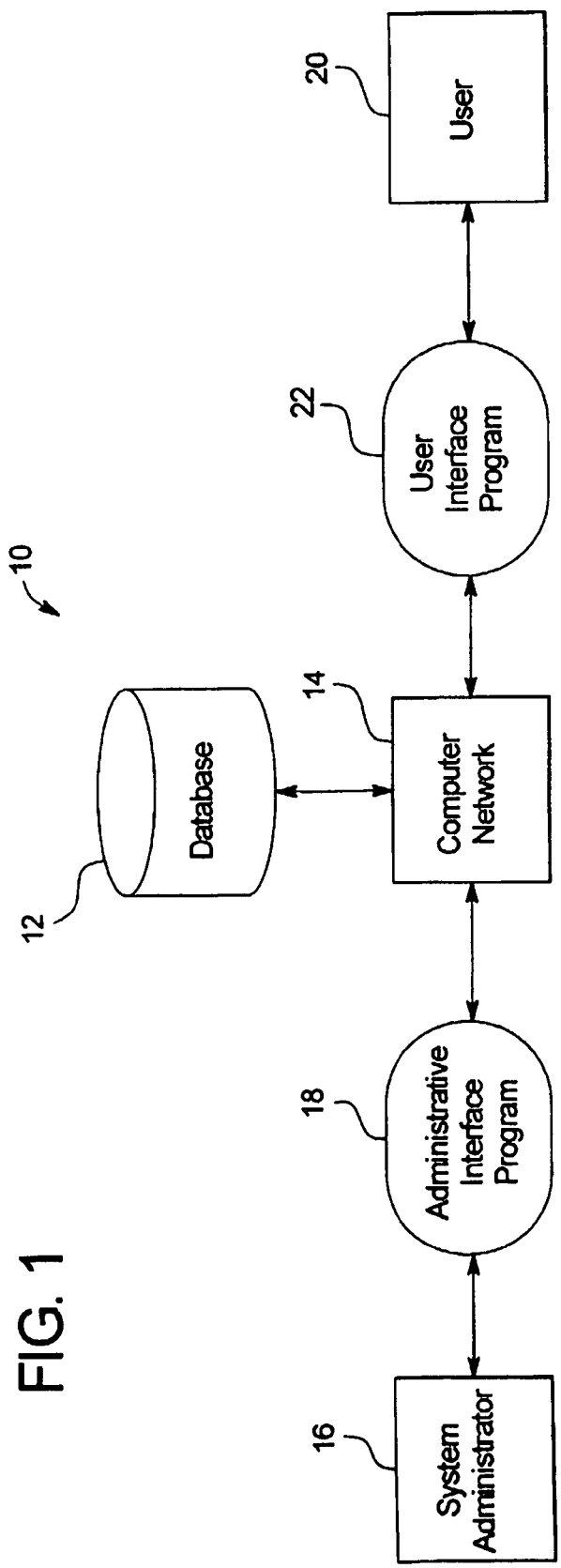
FIG. 1 is a schematic of a system for optimizing the selection of shops to repair railcars according to the present invention.

FIG. 1 illustrates a system 10 for optimizing the selection of shops to repair railcars. As shown in FIG. 1, the system 10 may include a database 12 for storing shop information as described below. The database 12 may be accessible through a computer network 14 by a system administrator 16 via an administrative interface program 18. Additionally, the database 12 may be accessible to a user 20 through the computer network 14 via a user interface program 22.

The database 12 may store a plurality of shop information to be used for selecting a shop for repairing a railcar via the system 10 as described herein. The shop information may be input to the database 12 by the system administrator 16 via the administrative interface program 18. The administrative interface program 18 may be a program that operates on the network 14 such that the system administrator 16 may input, modify, delete or otherwise control the content of the database 12. Additionally, the administrative interface program 18 may be a program that allows the system administrator 16 to input, modify, delete or otherwise control the content of the user interface program 22. Access to the database 12 via the administrative interface program 18 may be provided on the Internet, or any other network, so that the administrator 16 may access the database 12 by entering, for example, a user name and password.

The shop information may include the shop names, locations, and other information relevant to shop selection for railcar repair. For example, the following information may be associated with the shop information and stored within the database 12:

1) The particular car types that each shop may handle;

2) What shell tank materials each shop is certified for;

3) What tank pressure specifications each shop is authorized to handle;

4) What commodities each shop can handle if a railcar comes unclean; and

5) What bad orders each shop is approved for (i.e. what railcar damage the shop can repair).

The above information may be information that may not often change. However, a review of each shop may be conducted at periodic intervals to determine whether any of the above information has changed. If the shop information changes, the system administrator 16 may then modify the shop information stored in the database 12 as necessary.

Further, the shop information may include information that may be changed more often than the information noted above. For example, such information may include the following:

1) Recent or projected performances of the shop;
2) Projected inflow versus capacity;
3) Specific shop classification; and
4) Specific shop closure date ranges.

The "recent or projected performance of the shop" may include information concerning the quality of the service performed on railcars at each particular shop. Moreover, the "recent or projected performance of the shop" may further include information about how fast each shop may repair and otherwise process a railcar that may be serviced by the shop. The "projected inflow versus capacity" may include how busy each shop may be and whether the shop may have the capacity to service a railcar at the shop. In addition the "specific shop classification" may be a "catch-all" designation that may be assigned to each shop related to how easy or difficult it is to deal with the shop, get information from the shop, or for any other reason that may be apparent to those having ordinary skill in the art. Further, the "shop closure date ranges" may include information about the dates each shop is available to receive cars for repairs and the dates each shop is closed to new business. It should be noted that other information should be included in the database 12 for each shop that may be apparent to one having ordinary skill in the art and the database 12 should not be limited as herein described.

The user interface program 22 allows the user 20 to input information into the system 10 and, in return, provides the user 20 with an output of shops for repairing a railcar based on the information input by the user 20, as well as the shop information stored in the database 12. The user interface program 22 may be contained on a computer and/or a computer network, such as for example, the Internet or any other network that may be apparent to one having ordinary skill in the art. The user interface program 22 may include an input screen 24, as shown in FIG. 2, to enable the user 20 to input the information required to provide an optimized output. As shown in FIG. 2, the input screen may query the user 20 to provide information relating to the railcar having the bad order such as, for example, the railcar identification number, the railcar type, the railcar location and designation, whether the railcar is clean or partially filled with commodity, the identity of the commodity, and/or a particular bad order designation. The bad order designation may include the particular reason that the railcar may need to be repaired at a shop. For example, the bad order designation may be prompted as a "fill-in" screen that may allow the user 20 to enter the reason the railcar needs to be submitted to a shop. The bad order designation may selected from a standardized set of bad order designations; however, additional specific information relating to the type of railcar may be required if a lining bad order is picked as needing repair.

Preferably, a standardized set of bad order reasons may be stored by the user interface program 22 and presented to the user 20 when the user 20 completes the input screen 24. Generally, the input screen 24 may allow the user 20 to pick multiple bad order reasons for a single shopping of the railcar. Of course, the user 20 may be able to indicate what the bad order reason is if it is not presented on the standardized set.

Once the user 20 has completed inputting the required information into the input screen 24, the user interface program 22 may process the input information, as well as the shop information stored in the database 12, to provide the user 20 with an optimized list of available shops for repairing the bad order railcar. An example of an optimization process 26 that may be performed by the user interface program 22 is shown in FIG. 3.

Figure 3:
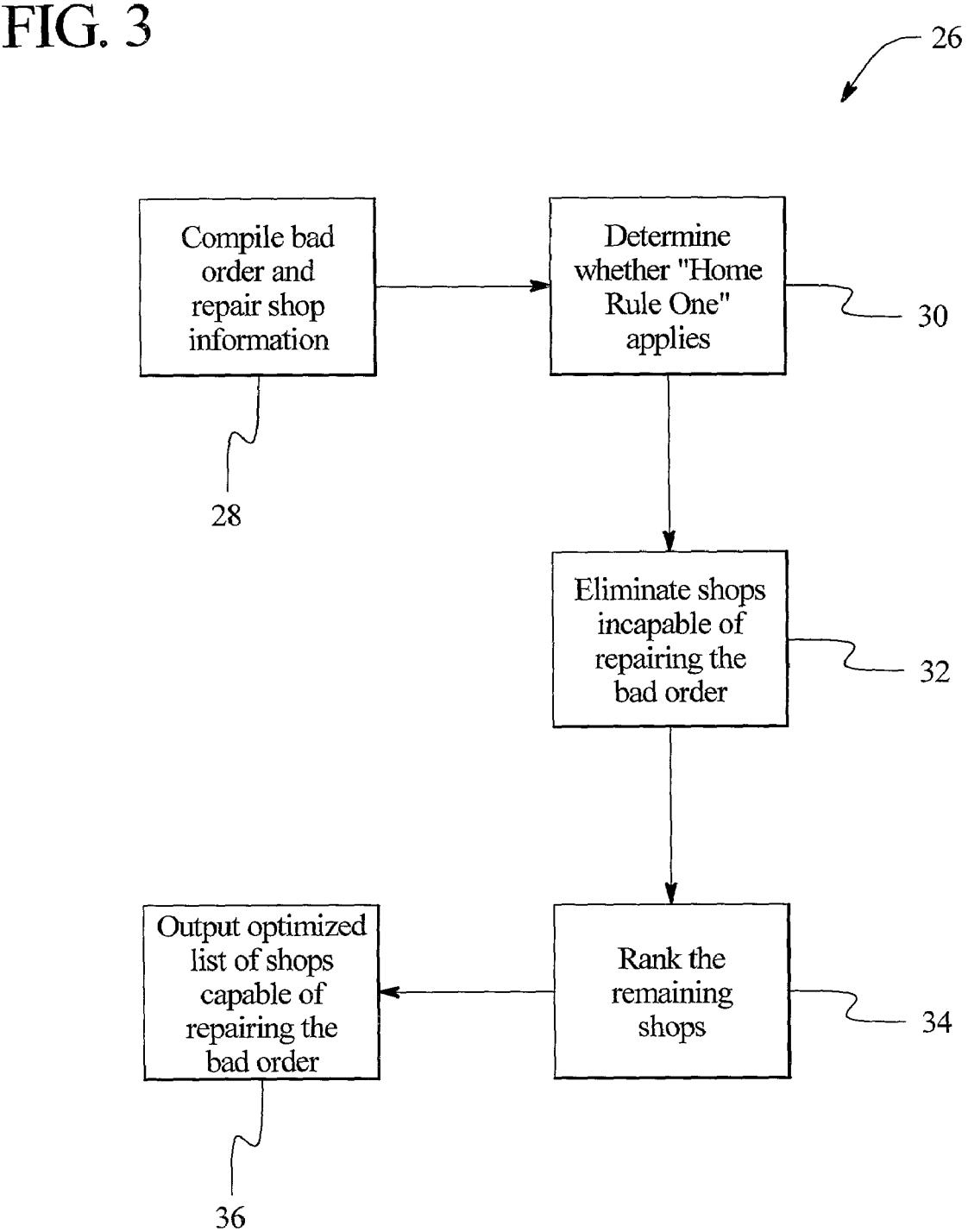
FIG. 3 is a flow chart illustrating an optimization process performed by a user interface program for the system shown in FIG. 1.

As shown in FIG. 3, the optimization process 26 may include compiling bad order and repair shop information via step 28, determining whether "Home Rule One" applies via step 30, eliminating the shops incapable of repairing the bad order via step 32, ranking the remaining shops via step 34, and outputting an optimized list of shops capable of repairing the bad order via step 36.

Compiling bad order and repair shop information via step 28 may include receiving information from the database 12 that had been input by the system administrator 16 via the administrative interface program 18, as well as receiving information input by the user 20 via the user interface program 22 as described above. The shop information and the information input by the user 20 are used by the user interface program 22 as described below.

Determining whether "Home Rule One" applies via step 30 may include determining the identity of the railcar to be repaired and whether the railcar falls under the "Home Rule One" standard of the railroad industry. The railcar identification number that may be entered into the input screen 24 may match information stored on the database 12 indicating that the particular railcar may fall under the "Home Rule One" provision. If so, the railcar may be sent back to its home pool by the lessor, with the shipment of the railcar being non-chargeable as per railcar industry rules. If a railcar falls under the "Home Rule One" provision, then the railcar may be immediately sent back to the lessee for the lessee to determine whether and where to service the railcar. Information relating to whether or not the railcar is determined to fall under the "Home Rule One" designation may be output by the user interface program 22 as part of step 36.

Eliminating the shops incapable of repairing the bad order via step 32 may include taking the information that had been entered into the user interface program 22 via the input screen 24 and comparing it to the shop information stored on the database 12 to determine which shop or shops may be utilized to service the railcar. Using the information acquired via step 28, the user interface program 22 may search the database 12 for a plurality of shops capable of servicing the bad order railcar. For example, the following information may be used to determine which shops are capable of servicing the bad order railcar:

1) Whether the shop is capable of handling the railcar type input by the user 20;
2) Whether the shop is certified for the particular tank shell material (determined from the railcar code or otherwise entered into the system via the input screen 24);
3) Whether the shop is authorized to handle the tank pressure specification (determined from the railcar code or otherwise entered into the system via the input screen 24);
4) Whether the shop can handle the commodity that the railcar shipped last, if the railcar is not clean; and
5) Whether the shop is approved for the bad order designation entered into the system via the input screen.

The user interface program 22 may then compile a list of shops capable of servicing the bad order railcar. For example, if a shop is not capable of handling the railcar type input by the user 20, or is otherwise not capable of handling the bad order for any reason, that shop will not be included on the compiled list.

Ranking the remaining shops via step 34 may include taking the information that had been entered into the user interface program 22 via the input screen 24 and comparing it to the shop information stored on the database 12 for the shops on the list generated via step 32 using various optimization criteria to determine a statistical ranking of the desirability of using each of the shops on the list generated via step 32. For example, each shop may be ranked according to the following criteria:

1) Expected and recent shop turnaround-time performance;
2) Estimated average In/Out transit time;
3) Predicted weekly shop inflow versus capacity;
4) Straight-line In/Out travel distance; and
5) Shop classification.

Each criterion may be used to generate an individual statistical ranking for each of the criteria for each shop. The rankings generated by the various criteria may be combined for each shop to provide a single statistical ranking for each shop. Each criterion may be weighted to determine an overall score for each shop. For example, each of five criterion may be weighted so as to equal 20% of the total score for each shop. Alternatively, each criterion may be weighted differently to favor one criterion over another as may be apparent to one having ordinary skill in the art. Preferably, the final score may be out of 100 total points. The shops may then be ranked in order of score and displayed in a list to the user 20 via step 36. For example, FIG. 4 illustrates an output screen 38 including an optimized list of available shops for bad order repair. As shown in FIG. 4, the output screen 38 may include the highest ranking shops and their associated scores, estimated input/output miles, estimated input/output times, and estimated days in shop. For example, the estimated days in shop may allow a user to gauge how long the railcar will be in the shop being repaired. If the railcar is designated to fall under the "Home Rule One" designation, that designation may be communicated to the user 20 via the output screen 38. Additionally, the output screen 38 may include the bad order railcar information as well as the date and time the optimization was requested and produced. Further, the output screen 38 may include other information as would be apparent to one skilled in the art.

After the user interface program 22 generates the output screen 38 for the user 20, the user 20 may have the option of choosing a particular shop for the railcar to be repaired based on the shops presented on the output screen 38. The various shops may be connected to the network 14 such that when the user 20 has chosen a shop, a notification may automatically be sent through the network 14 to the shop informing the shop of the imminent arrival of the railcar. Alternatively, a notification may be sent to the shop by email, facsimile, or any other method apparent to one having ordinary skill in the art. The notification may indicate the type of car, the type of repair necessary, and the estimated time of arrival. Moreover, if a part must be ordered to repair the railcar, the order for the part may be automatically placed with a supplier so that the part arrives at the shop quickly. The user may then ship the railcar to the chosen shop for repair of the railcar. In addition, information relating to the selection of a shop by the user 20 may be stored in the database 12 such that the database records are updated via the user interface program 22.

The output screen 38 may include a list that may comprise a specific number of shops that may be able to repair the railcar. For example, the list may be limited to the five shops having the highest statistical rankings. Alternatively, the shops that may score a certain percentage of the total points possible may be compiled into the list and presented to the user 20. Alternatively, only the top shops, according to rank, that fall within a certain distance of the railcar's present location may be presented to the user 20. Preferably, the top ranked shops may be listed and highlighted if the shops fall within 5% of the top shop that is presented. Of course, any number of shops may be presented and highlighted as may be apparent to those having ordinary skill in the art.

The database 12 may additionally include information relating to mobile repair units. The mobile repair units may be ranked in addition to the repair shops to provide the user 20 greater flexibility in deciding how to meet the railcar's repair needs. The mobile repair units may be statistically ranked in the same manner as the repair shops as described above; however, it may be desirable to give greater weight to the distance the mobile repair unit is located from the railcar than the other statistical factors analyzed as part of the ranking the remaining shops via step 34 as described above. Preferably, the mobile repair units are presented first as an option to the user 20 on the output screen 38. If the user 20 does not pick a mobile repair unit, then the user interface program 22 may query the user 20 as to the reasons why the user 20 did not choose any of the mobile repair units. The answer to the query may be compiled and stored within the database 12 for tracking or other purposes.

The user 20 of the user interface program 22 may have particular preferences that may be considered by the user interface program 22 when compiling the optimized lists of shops and mobile repair units, as heretofore described. For example, the user 20 of the present invention may prefer to use certain shops, or may prefer to not use certain shops. The user 20 may designate these preferences either by notifying the system administrator 16 prior to utilizing the user interface program 22 or as part of the user interface program 22 itself. These preferences may then be stored on the database 12 to be referenced each time the user 20 accesses the system 10 via the user interface program 22. The designations may include: (1) mandatory use shops; (2) recommended shops; and (3) not-to-be-used shops. The user interface program 22 may take these designations into account when compiling the lists of shops that are shown via the output screen 38. For example, the user 20 may input the information into the input screen 24, and the user interface program 22 may compile a list of shops that may be utilized by the user 20. If a "mandatory use" shop is not included on the list, then the user interface program 22 may add the preferred shop to the list that is presented to the user 20. Moreover, if a shop that has been designated as not-to-be-used by the user 20 and the shop is included on the compiled list of shops based on the input of the user 20, then the particular shop would be deleted from the list prior to being presented to the user 20. Alternately, the shop may be included on the list, but may be highlighted, or otherwise marked to indicate that the shop is one that has been designated as not-to-be-used by the user 20. In this case, the user 20 may still choose to use the particular shop that has been designated as not-to-be-used.

It should be noted that a shop that has been designated as being preferred by the user 20 must still pass step 32 in order to make it to the output screen 38. In other words, if the shop cannot handle the railcar type, is not certified for the particular tank shell material, is not authorized to handle the tank pressure specification, cannot handle the commodity if the railcar is unclean, is not approved for the bad order designation, or is otherwise incapable of handling the bad order, then the shop may not be presented on the output screen 38, even if the shop is designated as "mandatory use" or "recommended use" by the user 20.

The above-described system 10 may be contained on the Internet whereby the user 20 may type into a web browser, such as, for example, Netscape® or Microsoft Explorer®, the web address that may contain the portal for the user 20 to gain access to the above-described system 10. The user 20 may be required to type a username and a password to utilize the system 10. Moreover, the system administrator 16 may utilize a different portal and type in a different username and password to gain access to the system 10 so as to change the system 10, the information contained in the database 12, or the user interface program 22. Of course, any other network or means for accessing the system 10 may be provided as may be determined by a person having ordinary skill in the art.

Figure 5:
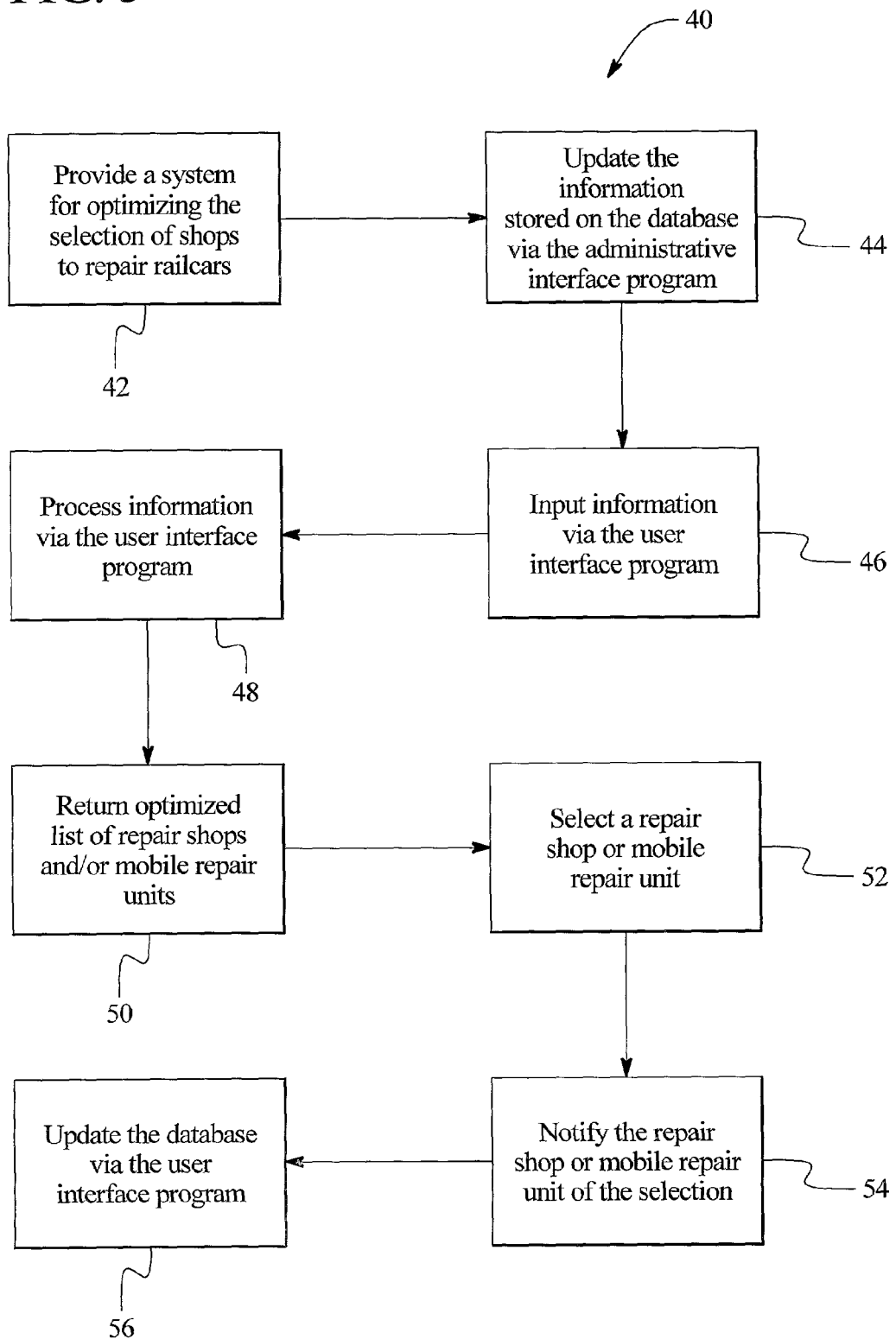
FIG. 5 is a flow chart illustrating a method of optimizing the selection of shops to repair railcars according to the present invention.

FIG. 5 illustrates a method 40 of optimizing the selection of shops to repair railcars. As shown in FIG. 5, the method 40 may include the steps of: providing a system 10 for optimizing the selection of shops to repair railcars via step 42, wherein the system 10 includes the database 12, the network 14, the administrator 16, the administrative interface program 18, the user 20 and the user interface program 22 described above; updating the information stored on the database via the administrative interface program 18 via step 44; inputting information via the user interface program 22 via step 46; processing the information input via the user interface program 22 via step 48; and returning an optimized list of repair shops and/or mobile repair units via step 50. The method 40 may also include the optional steps of: selecting a repair shop or mobile repair unit via step 52, notifying the repair shop or mobile repair unit of the selection via step 54, and updating the database 12 via the user interface program 22 via step 56.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by any claims that may stem from the present provisional application.

We claim:

1. A system for optimizing a user's selection of a shop to repair a railcar comprising:
   a database for storing shop information, mobile repair unit information and information relating to the railcar to be repaired, wherein said shop information includes at least the location of the shop and at least an expected shop turnaround-time performance or a recent shop turnaround-time performance, further wherein said mobile repair unit information includes at least the location of the mobile repair unit; and
   a user interface program for accepting information input from a user wherein the information input from the user includes at least information identifying the railcar, the location of the railcar and bad order information for the railcar, wherein said user interface program provides the user with an optimized list of shops and mobile repair units for repairing the railcar based on an analysis of at least the shop information, mobile repair unit information and information relating to the railcar to be repaired stored in the database and at least the information identifying the railcar and the bad order information input from the user, wherein said optimization is based on railcar repair shop ranking criteria established by the user interface program.

2. The system of claim 1 further comprising an administrative interface program to enable an administrator to modify the shop information stored on said database or modify said user interface program.

3. The system of claim 1 further comprising a computer network for associating said database and said user interface program.

4. The system of claim 3 wherein said computer network is the Internet.

5. The system of claim 1 wherein the user may select a shop to repair the railcar via said user interface program.

6. The system of claim 5 wherein said user interface program is associated with each shop such that, when the user selects a shop to repair the railcar via said user interface program, the selected shop is notified of selection.

7. The system of claim 6 wherein notifying the selected shop of the selection includes providing the shop information relating to the bad order information.

8. The system of claim 5 wherein the selection of a shop by the user causes said database to update said shop information to reflect the selection.

9. The system of claim 1 wherein the user may store individual shop preferences in said database such that said user interface program compiles a user specific output of shops based on the user's stored individual shop preferences.

10. A method of optimizing a user's selection of a shop to repair a railcar comprising the steps of:
    accepting information input from a user into a user interface program, wherein the information input includes bad order information;
    the user interface program requesting an optimized list of shops and mobile repair units to be provided from a database for storing shop information, mobile repair unit information and information relating to the railcar to be repaired, wherein said shop information includes at least the location of the shop and at least an expected shop turnaround-time performance or a recent shop turnaround-time performance, further wherein said mobile repair unit information includes at least the location of the mobile repair unit; and
    the user interface program providing the user with a list of shops capable of repairing the railcar based on an analysis of the bad order information and the shop information, mobile repair unit information and information relating to the railcar to be repaired, wherein said list of shops is optimized based on the information stored in said database, the information input from the user, and railcar repair shop ranking criteria established by the user interface program, wherein said railcar repair shop ranking criteria includes at least an expected shop turnaround-time performance or a recent shop turnaround-time performance.

11. The method of claim 10 further comprising the step of providing an administrative interface program for modifying the contents of said database and said user interface program.

12. The method of claim 10 further wherein said database and said user interface program are associated via a computer network.

13. The method of claim 12 wherein said computer network is the Internet.

14. The method of claim 10 further comprising the step of selecting a shop to repair the railcar via said user interface program.

15. The method of claim 14 wherein said user interface program is associated with each shop such that, when a shop is selected to repair the railcar via said user interface program, the selected shop is notified of selection.

16. The method of claim 15 wherein notifying the selected shop of the selection includes providing the shop information relating to the bad order information.

17. The method of claim 14 wherein the selection of a shop causes said database to update said shop information to reflect the selection.

18. The method of claim 10 wherein individual user's shop preferences may be stored in said database such that said user interface program compiles a user specific output of shops based on the individual user's stored shop preferences.

19. A system for optimizing a user's selection of railcar repair services comprising:
   a database that stores shop information, mobile repair unit information and information about one or more railcars to be repaired; and
   a user interface program tat accepts information input by the user, wherein the information relates to the one or more railcars to be repaired, wherein said user interface program creates an optimized listing of railcar repair shops and mobile repair units for each railcar to be repaired based on the shop information, mobile repair unit information, the information about one or more railcars to be repaired and information input by the user, wherein said optimized listing is optimized to minimize the out of service time for each railcar, wherein the out of service time includes the time it will take the railcar to reach the repair shop or mobile repair unit, the estimated time for the repairs to be completed and the time it will take the railcar to reach its designated destination after repair.

20. The system of claim 19 wherein individual shop preferences or requirements are stored in said database and said optimized listing of railcar repair shops is further based on said individual shop preferences or requirements.

* * * * *